(12) United States Patent
Perkins

(10) Patent No.: X1957
(45) Date of Patent: Jun. 29, 1813

(54) PRINTING PRESS, COPPER PLATE, & STEEL

(76) Inventor: Jacob Perkins

United States Patent

Patent No.: X1957

Jacob Perkins

June. 29. 1813.

Copperplate & Steel Printing Press

See. London Journal Arts & Sciences Vol. 1. p 161.